Figure 1:
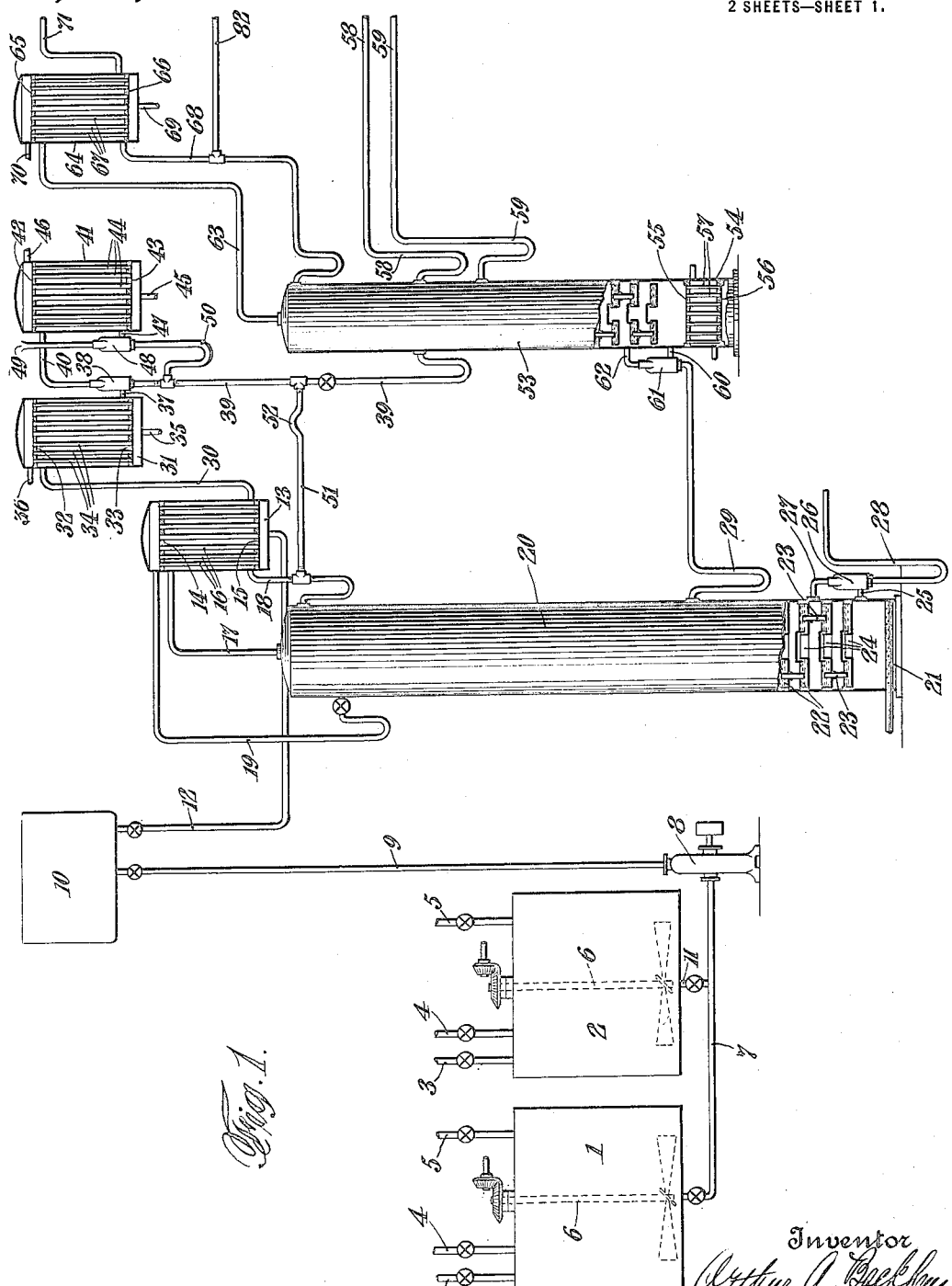

A. A. BACKHAUS.
APPARATUS FOR PRODUCING HIGH GRADE ESTERS.
APPLICATION FILED SEPT. 16, 1919.

1,403,224.

Patented Jan. 10, 1922.
2 SHEETS—SHEET 1.

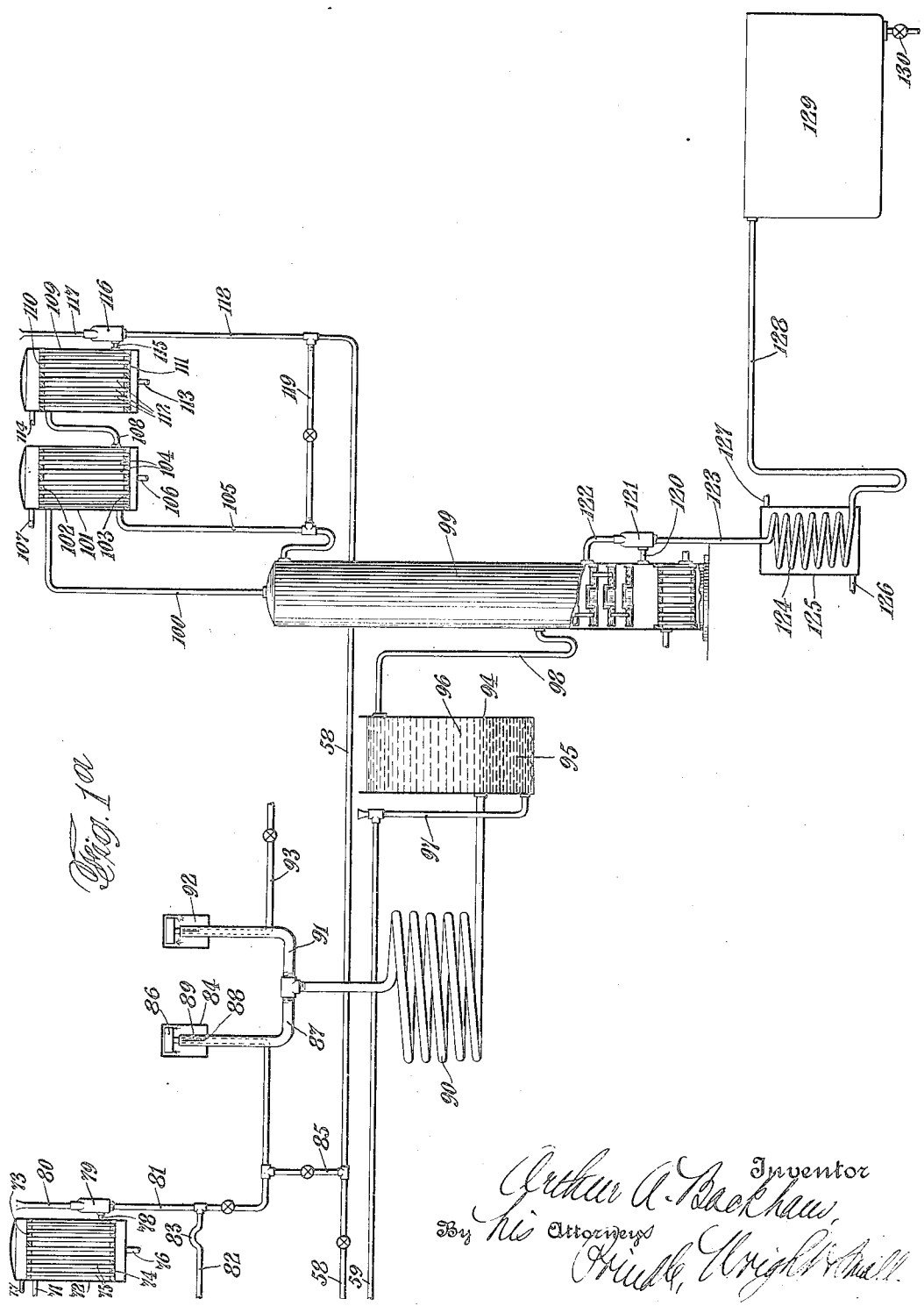

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

APPARATUS FOR PRODUCING HIGH-GRADE ESTERS.

1,403,224.     Specification of Letters Patent.     Patented Jan. 10, 1922.

Application filed September 16, 1919. Serial No. 324,178.

*To all whom it may concern:*

Be it known that I, ARTHUR A. BACKHAUS, a citizen of the United States, residing at Baltimore, in the State of Maryland, have invented a certain new and useful Improvement in Apparatus for Producing High-Grade Esters, of which the following is a specification.

My invention relates particularly to an apparatus for producing esters having a high purity, and especially ethyl acetate which is substantially free from water.

The object of the apparatus constituting my invention herein claimed is to provide esters which have a high degree of purity, and especially ethyl acetate of substantially 100% strength in an advantageous manner. Another object of my invention is to provide an apparatus of this character which is capable of continuous operation. Again another object of my invention is to produce esters of this character by rectifying a mixture of the particular ester with other substances, such for example as water and an alcohol, containing a larger percentage of the ester than would be present in a constant boiling mixture of these substances, so as to obtain an ester having substantially 100% strength. Still another object of my invention is to form an ester by bringing together an alcohol, an acid, and a catalyst, distilling off the ester with water and the alcohol mixed therewith, condensing the ester admixed with these other substances, and separating the ester from the latter by rectification. Again another object of my invention is to bring a body of water into contact with a constant boiling mixture containing an ester, an alcohol, and water, in which the ester is present in a larger percentage than would be present in a constant boiling mixture of these materials, thereby causing the materials to separate into a layer having a percentage of the ester greater than in the constant boiling mixture, and another layer containing a smaller percentage of the ester than in the constant boiling mixture. Furthermore, still another object of my invention is to rectify this layer containing the higher percentage of ester, so as to obtain an ester having a strength of substantially 100%. A further object is to produce esters from alcohols and organic acids in the presence of a catalyst by the introduction of live steam.

Further objects of my invention will appear from the detailed description thereof contained hereinafter.

While my invention is capable of being embodied in may different forms, for the purpose of illustration I have shown only one embodiment in the accompanying drawing, in which;

The figure is a diagrammatic representation of an apparatus which is made in accordance with my invention.

While my invention is capable of being employed in connection with the manufacture of different esters, and with the use of different starting materials, I shall by way of example describe but one form thereof, exhibiting the invention as applied to the manufacture of ethyl acetate from alcohol and vinegar with the aid of sulphuric acid.

In the drawing, I have shown two mixing tanks 1 and 2 which are designed to be used alternately, the construction of which is as shown exactly the same in the two tanks. The tank 1 is as shown provided with three inlet pipes 3, 4 and 5 admitting sulphuric acid, alcohol, and vinegar respectively. These three materials are preferably fed into the tank 1 in the proportion of about .33 parts by weight of sulphuric acid having a strength of 50° to 66° Bé., to 10 parts by weight of vinegar having a strength of 8% acetic acid, and $\frac{8}{10}$ part by weight of ethyl alcohol having a strength of 95%. These materials are mixed in the tank 1 by means of an agitator 6 driven from any suitable source of power. The mixed materials are fed out of the tank 1 into a valved pipe 7 from which they are discharged by a pump 8 through a pipe 9 into a supply tank 10. The mixing tank 2 is also shown connected to the pipe 7 by means of a valved branch pipe 11, and it will be understood that in the operation of the apparatus the two mixing tanks 1 and 2 will ordinarily be operated alternately. The pump 8 ordinarily supplies these mixed materials to the supply tank 10 continuously, and therefrom they may flow continuously by means of a valved pipe 12 through a combined dephlegmator and preheater 13, provided with tube sheets 14 and 15 and interposed tubes 16, through which these mixed materials are passed in order to be heated by heated vapors admitted between the tube sheets 14 and 15 by an inlet pipe 17 the condensate being discharged by a pipe 18. From the preheater 13 the preheated materials are preferably led through a trapped valved pipe 19 to a point near the top the side of an esterification column 20 maintained at a temperature of approximately 80° C., at the top thereof. In this embodiment heating steam passes into the column 20 through a perforated pipe 21 located in the bottom thereof, and is thus caused to pass through a descending current of the liquid passing over a plurality of pans 22 having intervening overflow pipes 23. The vapors are conducted from each pan to the succeeding pan through hooded vapor pipes 24. From the bottom of the column 20, the slop containing sulphuric acid is ordinarily continuously discharged by a pipe 25 leading to an overflow bottle 26 having a vapor outlet pipe 27 leading back to the column 20 and a liquid discharge pipe 28 passing out from the bottom of the bottle 26. In the side of the column 20, there is also shown a further trapped inlet pipe 29 for feeding into the same alcohol having a strength of 70–90%, which is supplied from a portion of the apparatus to be hereinafter described. Through the action of the catalyst, ethyl acetate is formed in the column, and continually passes out of the top of the same admixed with alcohol and steam by means such as the pipe 17, which is connected to the dephlegmator and preheater 13. The lower portion of the vapor space in the dephlegmator and preheater is shown as connected by the pipe 18 to the upper portion of the column 20, so as to convey back into the same the first distillate in order to keep the pans sealed in the column. From this point the vapors may pass from the dephlegmator and preheater by a pipe 30 to a warm condenser 31 having two tube sheets 32 and 33 connected with a series of tubes 34, and the temperature of which is maintained at 60–70° C., by a current of hot water passing into the same through inlet and outlet pipes 35 and 36. From this point the condensed liquid, which comprises approximately 10% by weight of ethyl acetate, 70% by weight of alcohol and 20% by weight of water, preferably passes out of the condenser by means of a pipe 37 to a bottle 38 having a valved trapped liquid outlet pipe 39 and a vapor outlet pipe 40 which latter leads to a cold condenser 41 having tube sheets 42 and 43 provided with a series of interposed tubes 44 cooled by a current of water supplied through inlet and outlet pipes 45 and 46. The condensate from the condenser 41 preferably passes by a pipe 47 into a bottle 48 having a vapor vent pipe 49 and a trapped liquid outlet pipe 50 which leads to the liquid outlet pipe 39. From the pipe 39 a pipe 51 ordinarily conveys any excess of the liquid not fed forwardly in the apparatus back to the pipe 18, so as to allow the same to be discharged in the column 20. This pipe 51 has an upwardly bent portion 52, so that only such excess will pass through the pipe 51. Means such as the pipe 39 conveys the mixed ethyl acetate, alcohol, and water into a separating column or rectifier 53, the interior of which is optionally constructed the same as in the case of the column 20, except that in this instance there is a steam heater 54 comprised of tube sheets 55 and 56 carrying a plurality of tubes 57. The upper portion of this column is preferably maintained at a temperature of substantially 70° C. In the side of the column 53, there are shown additional trapped liquid inlet pipes 58 and 59 leading from parts of the apparatus to be hereinafter described, and at the bottom of the column 53 there is shown an outlet pipe 60 leading to an overflow bottle 61 connected by a vapor outlet pipe 62 to the column 53, and connected at its lower end to the pipe 29. The vapors which pass out of the top of the column 53 are comprised of a mixture of ethyl acetate, alcohol, and water, the principal constituent of which is ethyl acetate. These vapors are conveyed by means such as a pipe 63 to a dephlegmator 64 having tube sheets 65 and 66 carrying tubes 67 and provided with a trapped liquid return pipe 68 leading back to the top of the column 53 in order to keep the pans therein sealed with liquid. The dephlegmator 64 is shown as cooled by a current of cooling water supplied with the aid of inlet and outlet pipes 69 and 70. From this dephlegmator 64 the uncondensed vapors may pass by a pipe 71 to a condenser 72 having tube sheets 73 and 74 carrying tubes 75 and cooled by a current of water supplied with the aid of inlet and outlet pipes 76 and 77. The condensate, which ordinarily comprises a constant boiling mixture of ethyl acetate, alcohol, and water, contains approximately 83% of ethyl acetate, 9% of ethyl alcohol, and 8% of water, and is conveyed out of the condenser 72 by means such as a pipe 78 to an overflow bottle 79 having a vent 80 and a valved liquid outlet pipe 81. From this outlet pipe 81 a pipe 82 is preferably provided for conveying any excess of the liquid back to the pipe 68 and thence to the column 53, said pipe 82 being shown as provided with an upwardly bent portion 83 to permit only such excess to be fed in this direction. The pipe 81 conveys this constant boiling mixture to a measuring receptacle 84, but is preferably connected in advance of said measuring receptacle 84 by means of a valved pipe 85 to the pipe 58, so that the liquid in the pipe 58 may, if desired, be also fed to the measuring receptacle 84 instead of being led by the pipe 58 into the column 53. When the liquid in the pipe 58 contains at least 80% ester, it will be fed through the pipe 85 into the pipe 81, but if the percentage of the ester is lower, it will be fed instead by the pipe 58 back into the column 53. The measuring receptacle 84 has attached to the inlet pipe 81 therein a container 86 which discharges the liquid laterally near the inner periphery of the receptacle 84, and around the inlet pipe 81 there is located, in this embodiment, an outlet pipe 87 having a slot 88 with a scale 89 at the side thereof to indicate by the height of the level of the liquid in the receptacle 84 the speed of outflow of the liquid. The measuring receptacle 84 is provided with a glass window in order to see the scales on pipe 87. The pipe 87 conveys this constant boiling mixture of ethyl acetate, alcohol, and water, to a mixing coil 90 which is supplied with water by means of a pipe 91 leading from a measuring receptacle 92 constructed in the same manner as the measuring receptacle 84, and which is continuously supplied with water by means of a valved pipe 93. From the mixing coil 90 these liquids pass into a separating chamber 94 where the liquid separates into a lower water layer 95 containing small percentages of ethyl acetate and alcohol, and an upper layer 96 containing approximately 93% of ethyl acetate, 5% of water, and 2% of alcohol. In the form shown, the lower layer containing the small percentage of ethyl acetate passes out of the separating chamber 94 by a vented overflow pipe 97 to the pipe 59, and thence back to the column 53. The upper layer of liquid 96 containing a higher percentage of ester flows out of the chamber 94 by means such as a trapped pipe 98 into the side of a drying or rectifying column 99. This column 99 is ordinarily constructed on the interior thereof in the same manner as the column 53. The lower portion of the column 99 is maintained at a temperature of substantially 75° C. The vapors passing out of the top of the column 99 are preferably conveyed by a pipe 100 to a dephlegmator 101 having tube sheets 102 and 103 carrying a plurality of tubes 104, and arranged to return the liquid therefrom by a trapped pipe 105 to the upper end of the column 99 in order to seal the pans therein. Said dephlegmator 101 is ordinarily cooled in the usual manner by means of a current of water supplied with the aid of inlet and outlet pipes 106 and 107. The uncondensed vapors pass out of the dephlegmator 101 by a pipe 108 to a condenser 109 having tube sheets 110 and 111 provided with tubes 112 and cooled by a current of water with the aid of inlet and outlet pipes 113 and 114. The condensate which will ordinarily comprise constant boiling mixtures of ethyl acetate, alcohol, and water, passes out of the condenser 109 by a pipe 115 to an overflow bottle 116 having a vent 117 and an outlet pipe 118. This outlet pipe 118 is as shown connected by a valved pipe 119 to the pipe 105, so that when desired the liquid may be returned to the column 99 so as to avoid returning the liquid to the column 53 when the latter or some part associated therewith is to be thrown out of operation temporarily. Ordinarily, however, this pipe 119 will be closed and the liquid will be fed from the pipe 118 to the pipe 58, and thence either into the measuring receptacle 84 or the column 53 according to the composition of the liquid as above pointed out. From the bottom of the column 99 ethyl acetate having a strength of 95 to 100% preferably passes out by a pipe 120 to an overflow bottle 121 having a vapor outlet pipe 122 leading back to the column 99 and an outlet pipe 123 leading out of the bottom of the bottle 121. This pipe 123 ordinarily conveys the ethyl acetate to a cooling coil 124 located in a cooler 125 cooled by a current of water supplied with the aid of inlet and outlet pipes 126 and 127. The cooled ethyl acetate may pass away from the cooler 125 by means of a trapped pipe 128, and be collected in a storage receptacle 129 from which it may be drawn off from time to time, as desired, by a valved pipe 130.

The operation of my invention will be apparent from the above description. It will be understood, however, in general that to provide an excess of alcohol the tank 10 is, in starting, ordinarily filled with alcohol, and the sulphuric acid, alcohol, and vinegar are mixed in the proper proportions hereinabove referred to in the two tanks 1 and 2 alternately, and that from one or the other of these tanks the mixed materials are conveyed continuously to the supply tank 10 from which they are continuously conveyed through the preheater 13 to the esterification column 20, from the bottom of which the slop containing sulphuric acid is continuously discharged, while the vapors of ethyl acetate, alcohol, and water pass out of the top of the same to the preheater 13 which acts also as the dephlegmator, to return to the column 20 the first condensate. From the dephlegmator 13 the vapors pass into the hot condenser 31 and finally the cold condenser 41, so as to condense the vapors to a liquid with the minimum loss of heat, and thus obtain a mixture of ethyl acetate, alcohol and water in the form of a liquid prior to supplying the same to the separating column 53. It is highly desirable to condense these vapors to a liquid at this point as otherwise owing to the low latent heat of vaporization of the ethyl acetate present compared with the high latent heat of vaporization of the alcohol present, if these materials were fed into the column 53 in uncondensed form, the ethyl acetate in the column 53 would be vaporized to a disadvantageous degree because of the large amount of heat present. In the column 53 the ester is very largely separated from the alcohol, the alcohol being fed back into the esterification column while the ester and admixed remaining alcohol and water are obtained in the form of a constant boiling mixture which is thereafter intermingled with water in the coil 90, so as to form the two layers of liquid containing high and low percentages of ethyl acetate respectively in the chamber 94. The layer containing the lower percentage of ethyl acetate is fed back into the separating column 53 while the layer containing the higher percentage of ethyl acetate is conveyed into the drying column 99 where the excess of the ester over the constant boiling mixture of ethyl acetate, alcohol, and water is drawn off at the bottom passed through the cooler 125, and received in the storage receptacle 129, the constant boiling mixture being returned from the top of the column 99 either to the measuring receptacle 84 or the column 53. In this way, it is possible to obtain continuously ethyl acetate having a strength of 95 to 100% according to the operation of the apparatus.

It will be understood that other acids and other alcohols may be used instead of the acetic acid or vinegar and the ethyl alcohol, as for example butyric acid and methyl alcohol and that instead of the sulphuric acid another catalyst may be used, as for example hydrochloric acid or some other organic acid, such as formic acid.

While I have described my invention above in detail, I wish it to be understood that many changes may be made therein without departing from the spirit thereof.

I claim:

1. In combination, an esterification column, a combined preheater and dephlegmator therefor, a condenser for the vapors passing therefrom, and a rectifier for the condensate.

2. In combination, an esterification column, a combined preheater and dephlegmator therefor, a condenser for the vapors passing therefrom, and a rectifier for the condensate connected by a pipe to the esterification column for returning alcohol thereto.

3. In combination, an esterification column, a dephlegmator, a condenser for the vapors evolved therefrom, and a rectifier for the condensate connected by a pipe to the esterification column for returning alcohol directly thereto.

4. In combination, an esterification column, a rectifier for the ester obtained therefrom, a condenser connected to the rectifier, and means for intermingling the condensate with a body of water in a regulated manner.

5. In combination, an esterification column, a rectifier for the ester obtained therefrom, a dephlegmator, a condenser connected to the rectifier, and means for intermingling the condensate with a body of water in a regulated manner.

6. In combination, an esterification column, a rectifier for the ester obtained therefrom, a condenser connected to the rectifier, means for intermingling the condensate with a body of water, and a separating chamber for the intermingled liquids.

7. In combination, an esterification column, a rectifier for the ester obtained therefrom, a dephlegmator, a condenser connected to the rectifier, means for intermingling the condensate with a body of water, and a separating chamber for the intermingled liquids.

8. In combination, an esterification column, a rectifier for the ester obtained therefrom, a dephlegmator, a condenser connected to the rectifier, means for intermingling the condensate with a body of water, a separating chamber for the intermingled liquids, and a second rectifier for the upper liquid layer.

9. In combination, an esterification column, a rectifier for the ester obtained therefrom, a dephlegmator, a condenser connected to the rectifier, means for intermingling the condensate with a body of water, a separating chamber for the intermingled liquids, and a second rectifier for the upper liquid layer.

10. In combination, an esterification column, a rectifier for the ester obtained therefrom, a dephlegmator, a condenser connected to the rectifier, means for intermingling the condensate with a body of water, a separating chamber for the intermingled liquids, a second rectifier for the upper liquid layer, and a pipe connecting the lower portion of the separating chamber to the first rectifier.

11. In combination, an esterification column, a rectifier for the ester obtained therefrom, a dephlegmator, a condenser connected to the rectifier, means for intermingling the condensate with a body of water, a separating chamber for the intermingled liquids, a second rectifier for the upper liquid layer, and a pipe connecting the lower portion of the separating chamber to the first rectifier.

12. In combination, an esterification column, a rectifier for the ester obtained therefrom, a dephlegmator, a condenser connected to the rectifier, means for intermingling the condensate with a body of water, a separating chamber for the intermingled liquids, a second rectifier for the upper liquid layer, a pipe connecting the lower portion of the separating chamber to the first rectifier, a condenser connected to the second rectifier, and means for returning the condensate to the first rectifier.

13. In combination, an esterification column, a rectifier for the ester obtained therefrom, a dephlegmator, a condenser connected to the rectifier, means for intermingling the condensate with a body of water, a separating chamber for the intermingled liquids, a second rectifier for the upper liquid layer, a pipe connecting the lower portion of the separating chamber to the first rectifier, a condenser connected to the second rectifier, and means for returning the condensate to the first rectifier.

14. In combination, an esterification column, a rectifier for the ester obtained therefrom, a dephlegmator, a condenser connected to the rectifier, means for intermingling the condensate with a body of water, a separating chamber for the intermingled liquids, a second rectifier for the upper liquid layer, a pipe connecting the lower portion of the separating chamber to the first rectifier, a condenser connected to the second rectifier, means for returning the condensate to the first rectifier, and means for alternately returning it to the condensate from the first rectifier.

15. In combination, an esterification column, a rectifier for the ester obtained therefrom, a dephlegmator, a condenser connected to the rectifier, means for intermingling the condensate with a body of water, a separating chamber for the intermingled liquids, a second rectifier for the upper liquid layer, a pipe connecting the lower portion of the separating chamber to the first rectifier, a condenser connected to the second rectifier, means for returning the condensate to the first rectifier, and means for alternately returning it to the condensate from the first rectifier.

16. In combination, an esterification column provided with means for feeding reacting ingredients and a catalytic to a point near the top of the side thereof, with means for the introduction of live steam and means for the withdrawal of waste at points near the bottom thereof, a condenser provided with means for returning a less volatile fraction of the evolved vapors to a point below the top of said column, a separating column receiving the condensate from said condenser, an additional condenser receiving vapors from said separating column, and means for continuously admixing a condensate from the last mentioned condenser in regulable ratio with water as and for the purpose set forth.

17. In combination, an esterification column provided with means for feeding reaction ingredients and a catalytic to a point near the top of the side thereof, with means for the introduction of live steam and means for the withdrawal of waste at points near the bottom thereof, a condenser provided with means for returning a less volatile fraction of the evolved vapors to a point below the top of said column, a separating column receiving the condensate from said condenser, an additional condenser receiving vapors from said separating column, means for continuously admixing a condensate from the last mentioned condenser in regulable ratio with water, means for permitting a separation and stratification of unlike liquids from the resulting mixture, and means conveying the respective layers to separate columns for further treatment.

In testimony that I claim the foregoing, I have hereunto set my hand this 21st day of August, 1919.

ARTHUR A. BACKHAUS.